United States Patent 3,694,305
Patented Sept. 26, 1972

3,694,305
FLAME RETARDANT FIRE BARRIER COMPOSITION AND LAMINANT

Sheikh Mohammad Munawwar, Metuchen, N.J., assignor to Compac Corporation, Newark, N.J.
No Drawing. Filed Jan. 11, 1971, Ser. No. 105,632
Int. Cl. B32b 15/06, 15/08, 15/12, 19/04, 25/06, 27/30, 29/00
U.S. Cl. 161—205                9 Claims

ABSTRACT OF THE DISCLOSURE

An improved flame retardant fire barrier adhesive composition embodying a novel emulsion type laminant. The emulsion type laminant is not only an inherently non-burning adhesive by itself, but also imparts flame-retardancy to an otherwise combustible outer surface of a combustible fibrous substrate of a laminate of which it is the laminant, or otherwise makes itself available to smother any flame by synergistic effect, created within the laminant structure.

---

The present invention relates to an improved fireproofing composition, and one which is essentially an emulsion type adhesive for laminating various plies of a flame retardant fire barrier. The composition provides an adhesive which not only acts as a functionally good lamination bond between laminating plies such as fibrous paper or film and foil, but also renders the flammable fibrous material (which may constitute one or more plies of the laminate) effectively and permanently flame retardant.

The flame retardant barrier currently employed for flame-resistant jacketing, facing material in duct insulation and sheathing on fiber glass blankets, usually consisting of a ply of combustible or non-combustible paper or film, bonded with an adhesive to a metal foil, are of two general types.

In one type, the laminant comprises hot melt type adhesives, which are non-burning, and when heated emits large quantities of gas that has flame-snuffing action on the combustible portion of the laminate; and hence, untreated (non-flame-proof) substrates can be used. This approach has two potential drawbacks:

Firstly, due to the thermal flowing nature of the hot melt adhesive, the adhesive tends to soften and has the tendency to delaminate when exposed to fire conditions. Therefore, a combustible laminate ply such as kraft, when delaminated, will continue to burn.

Secondly, excessive amounts of hot melt laminant is used to render the combustible fibrous plies of the laminate flame-retardant. These adhesives are generally used at 50 pounds to 150 pounds/3,000 square feet dry weight. Also, because of the nature and excessive amount of adhesive used, the laminate also has the tendency to "cold flow," causing waste in use, due to sticky edges. A construction of this type is described in U.S. Pat. No. 3,034,939, of Newkirk et al.

The second type of construction comprises various paper, film, and foil combinations laminated with an emulsion type adhesive. These adhesives are non-burning, but possess little or no potential in flame-proofing the combustible plies of the laminate. Constructions made with these adhesives must employ sufficiently non-burning plies; for example, flame retardant treated krafts and vinyl films. A construction of this type is described in U.S. Pat. No. 3,202,567 of Muri et al. The major drawback of this second type of construction is that the use of chemically treated paper is a must. Paper treated with certain salts, such as di-ammonium sulfate, ammonium sulfamate, di-ammonium phosphate, sodium silicate, have excellent flame retardancy, but due to the hydroscopic nature of most flame-retardant salts, they leach out at higher humidity or exposure to water, leaving a flammable sheet.

Permanent flame resistant krafts, which cannot be leached out on exposure to high humidity or water, are also being made by certain paper mills, and used in the construction of flame retardant barrier material. In such instances, kraft is impregnated with halogenated hydrocarbons, in combination with zinc or antimony compounds as synergists, which provide good flame retardancy and resistance to water. Some other mills use vinyl or vinylidiene halide, emulsion and synergists, at several points in the paper making process. For example, beater addition or size press treatment, when the sheet is still moist. "Duro-M Flame-Proof Kraft," by Mosinee Paper Mills in Mosinee, Wis., is an example of this type of permanently treated flame-proof kraft.

THE INVENTION

The present invention provides:

(1) A flame retardant fire barrier composition comprising an adhesive mix consisting essentially of the following ingredients: (a) a halogenated paraffin; (b) an oxide of metal of the arsenic group; (c) a filler selected from the group of a hydrated metal oxide, calcium silicate, calcium carbonate and magnesium silicate; and (d) a bond or binder for the mix of a polymer consisting of a synthetic resin or elastomer material, said adhesive mix being inherently non-burning and when subjected to a flame and flame temperatures imparts flame-retardancy to a substrate to which the adhesive mix is adhered; and (2) Fire retardant barrier laminates characterized by low flame spread and smoke development comprising plies of: a conventional metal foil, a non-flameproof fibrous material such as natural kraft paper, laminated with an inherently non-burning and flame-retarding emulsion type laminant adhesive mix, primarily consisting of halogenated paraffins, an oxide of a metal of the arsenic group, a filler such as hydrated amphoteric metal oxide and a synthetic resins or elastomeric binder such as neoprene latex, with judicious use of an appropriate curing agent, antioxidants, wetting agents, anti-foam, and stabilizer; this laminant adhesive is not only inherently non-burning, but also imparts flame-retardancy to the combustible outer plies of the laminate.

The laminate product of the present invention is a lightweight, durable flame-resistant construction, with excellent flexibility and moisture-vapor-transmission resistance, and possesses all these values after accelerated aging (72 hours and 300° F.).

The flame retardant barrier of the present invention, comprised of plies of aluminum foil and untreated kraft laminated with the above referred to emulsion type adhesive has passed the Underwriters Laboratory requirements for non-combustible products on flame spread and smoke development.

The National Fire Protection Association imposes certain specifications on judging the flame retardant qualities of flame retardant barrier materials, and their 90A rating requires a flame spread of 25 or less, smoke development of 50 or less. The less demanding 90B Rating requires a flame spread of 50 or less and smoke development of 100 or less, based on the following standards:

| | | |
|---|---|---|
| Cement board | 0 flame | 0 smoke. |
| Red Oak | 100 flame | 100 smoke. |

The test procedure to determine these values is given in the Underwriters Laboratory publication Subject 723, published in August 1950.

The above referred to construction which was subjected to Underwriters Laboratory rating tests, consists of one ply of 30 lb. untreated kraft; the second ply of 0.0007" aluminum foil, which was reinforced with fiber glass, was laminated with 20.0, 22.5, 25.0 and 30 pounds/3,000 square feet of dry adhesive.

In the machine laminating operation employed, the emulsion type adhesive was laid on the foil and the untreated kraft with fiber glass reinforcement was combined to form a laminate, which was carried by roller onto the series of heated drums (temperature 200–250° F.), where lamination, drying and partial impregnation of the kraft was accomplished, forming commercially laminated flame retardant barrier material.

The Underwriters Laboratory exploratory rating for the above construction was:

| Dry laminant | Flame spread | Smoke |
| --- | --- | --- |
| Coating weight lbs./3,000 square feet: | | |
| 20 | 28 | 6 |
| 22.5 | 25 | 8 |
| 25 | 25 | 11 |
| 30 | 25 | 10 |

The above results indicate that the construction of the present invention successfully qualifies by Underwriters Laboratory for 90A rating at a dry laminant coating weight of 22.5 pounds per 3,000 square feet or above. At an unusually low coating weight of 20 lbs./3,000 square feet or slightly lower, the construction still qualifies by Underwriters Laboratory testing for rating 90B. The Underwriters tunnel test showed no sign of any delamination of laminate under fire conditions.

Similar tests were conducted at the Underwriters Laboratory, using 0.007" foil and 22 pound/3,000 square feet untreated kraft. Only 20 pounds/3,000 square feet of dry emulsion type adhesive was required to achieve a 90A rating with minimal smoke development. The results are:

Flame spread _____ 25
Smoke _____ 4

Another test was made to see the effects of similar types of emulsion based adhesive on Duro-M Kraft (a permanent flame-proof kraft). In this construction, 45 pounds/3,000 square feet Duro-M bleached kraft was laminated with .001" foil, with fiber glass reinforcement, and 22 pounds/3,000 square feet dry laminant weight. Underwriters Laboratory show the following excellent results:

Flame spread _____ 13, as against 25 for 90A.
Smoke _____ 0, as against 50 for 90A.

This construction not only showed better flame retardant properties, but also achieved better flexibility, as compared to the laminate currently used in the trade, which indicates a Flame spread of 20 and Smoke of 35.

From the results of these tests, it can be seen that the results are well under the 90A rating for Flame and Smoke established by the National Fire Protection Association.

The relative proportions of the essential ingredients of the emulsion type laminate composition and laminate of the invention may be varied within substantial limits, a preferential relative proportion by weight of solids being: halogenated paraffins from 35% to 50%; oxide of metal of the arsenic group from 9% to 20%; hydrated metal oxide from 5% to 40%; resin or elastomeric binder from 10% to 40%; and the adhesive weight of the laminant from 70% to 110% based on the fibrous material.

The fibrous ply of the laminate is preferably selected from the group of non-flame resistant kraft paper, flame resistant kraft paper, and non-woven fibrous sheets and webs. The plastic film used in lieu of the fibrous ply, is preferably selected from the group consisting of polyvinyl chloride, polyvinylidene chloride and copolymers thereof.

The oxide of metal of the arsenic group ingredient of the laminant composition is selected from the group of the oxide of antimony and arsenic.

The synthetic resin or elastomeric binder of the composition mix is preferably selected from the group of neoprene latex, polyvinylidene chloride latex, vinyl chloride acrylic copolymer, polyvinyl chloride latex, vinyl acetate copolymer and styrene-butadiene latex, although natural latex rubber may also be used.

This bond ingredient prevents the flame-proof barrier material from delamination at elevated temperatures or even under fire conditions.

The hydrated metal oxide acts mainly as a filler and supplies the water of reaction for the mixture when subjected to flame conditions. Hydrated aluminum oxide is preferred, although other hydrated oxides may be used therefor and fillers such as calcium silicate, calcium carbonate and magnesium silicate.

The following examples are illustrative of emulsion type adhesives produced according to the invention:

EXAMPLE I

| Ingredients: | Parts by wt. |
| --- | --- |
| 10% casein solution | 24.65 |
| Triton X–100 (wetting agent) | 0.58 |
| Hydrated aluminum oxide | 37.46 |
| Antimony oxide | 15.00 |
| Zinc oxide dispersion, 50% solid | 3.85 |
| Antioxidant | 1.54 |
| Neoprene Latex 400, 50% solids | 77.05 |
| 10% sodium dichromate solution | 0.36 |
| Antifoam AF | 0.50 |
| Water emulsion of liquid chlorinated paraffin, 70% chlorine (6.5% solid) | 70.00 |

The above emulsion type adhesive can be diluted with water to the required viscosity to suit the coating and laminating conditions.

Laminations of untreated kraft (30 pounds per 3,000 square feet) and 0.007" aluminum foil were made using the adhesive in Example No. I. At 22.5 pounds per 3,000 square feet dry weight, it passed the Underwriters Laboratory test for 90A rating, with Flame Spread of 25 and Smoke at 8.

EXAMPLE II

| Ingredients: | Parts by wt. |
| --- | --- |
| 10% casein solution | 24.65 |
| Triton X–100 (wetting agent) | 0.58 |
| Hydrated aluminum oxide | 37.46 |
| Zinc oxide dispersion, 50% solid | 3.85 |
| Antioxidant | 1.54 |
| Neoprene Latex 400, 50% solid | 77.05 |
| 10% sodium dichromate solution | 0.36 |
| Antifoam AF | 0.50 |
| Water Emulsion of liquid chlorinated paraffin, 70% chlorine (66.5% solid) | 70.00 |

Dilute the above emulsion type adhesive to the required viscosity.

Example II differs from Example I in that antimony oxide is eliminated and the amount of liquid chlorinated paraffin is reduced.

Lamination of permanently treated kraft "Duro-M Flame-Proof Kraft," 45 pounds/3,000 square feet, and one-mil aluminum foil was made using the adhesive in Example II, at 22 pounds/3,000 square feet, with the following results:

Flame spread _____ 13, as against 25 for 90A.
Smoke _____ 0, as against 50 for 90A.

The composition which I have found per Example No. I as a laminating adhesive is fully adapted to extinguish flame under combustion conditions, comprises water emulsion of chlorinated paraffin, having a percentage of chlorination lying in the 50–70% range, a fire-proofing compound selected from groups consisting of water insoluble salts and oxide of antimony and arsenic, the preferred material, however, is the oxide of antimony. The preferred filler is hydrated aluminum oxide, containing water of crystallization or equivalent hydrated oxides. As already stated fillers like calcium silicate, magnesium silicate, calcium carbonate may also be used. The zinc oxide has been used as a vulcanizing agent for neoprene, which also enhances cohesive strength of the adhesive.

The presence of the chlorinated paraffin and oxides of antimony create a synergistic effect, whereby antimony oxide donates the metallic element made available by high temperature decomposition for combination with hydrogen chloride evolved by decomposition of chlorinated organic compound to form a heavy, flame smothering vapor of antimony chloride to smother flame under condition of combustion.

Vapors of antimony chloride, which act as an excellent flame retardant, will migrate from the adhesive body to cover the combustible outer surface of the combustible fibrous material of the laminate and make itself available to smother the flame. The presence of water of crystallization in the hydrated oxide seems to help provide steam under fire conditions, which accelerated the formation of hydrogen chloride. Hence, faster synergistic effect is obtained with antimony compounds.

Casein is used as a stabilizing agent and other materials are used to effect adequate wetting, dispersing, avoid foaming and retard oxidation.

Example II formulation, omitting antimony oxide, further evidences the synergistic effect in the system. "Duro-M Kraft," which was laminated to the metal foil with this adhesive, is already impregnated with halogenated resins and antimony oxide, the presence of which was enough to create the synergistic flame smothering effect and obtain excellent Underwriters Laboratory Flame Spread and Smoke results.

As can be seen from the discussion above, because of the synergistic effect which has been developed in the emulsion type adhesive system (Example I), any cellulosic material on exposure to excessive heat is quickly converted to a hard carbonaceous mass, which, in turn, effectively prevents the propagation of flame front. The construction possesses excellent durable flame resistant properties, low smoke characteristics, high resistance to the passage of moisture vapors, has excellent flexibility and is strong enough for extended uses. The adhesive does not contain any water soluble components, and would not leach out and reduce the fire retardant properties.

The following are specific substituted ingredients for essential elements of Example I:

For the 15.0 parts of antimony oxide, a corresponding part (15.0) of antimony trioxide or arsenic trioxide, as well as antimony trisulphide and arsenic trisulphide;

For the 70.0 parts of the liquid chlorinated paraffin, 70.0 parts of the product sold as "Rez-O-Sperse 3" (Dover Chemicals) 66.5% solid, or 55 parts of chlorinated, bi-, tri- and ter-phenyls such as Araclors 1260, 4465 and 5465 (Monsanto); or 47 parts of a powdered or emulsified chlorinated polymer sold as "Chloro-Wax 70" (Diamond Shamrock Corp.);

For the Neoprene Latex 400 ingredient, 77.05 parts of 460 × 1 vinyl chloride copolymer (B. F. Goodrich Co.); or 77.05 parts of Pliolite latex, a styrene-butadiene rubber latex (Goodyear Co.).

The conclusion of the efficacy of the products of the formulations of the present invention was indicated by the Laboratory evaluation for flame resistance of the emulsion based adhesive detailed below used as the laminant, to laminate 30 pounds/3,000 square feet untreated kraft and 0.0007" foil, with a laminant coating weight of 30 pounds/3,000 square feet. The laminate was dried in an oven at 300° F. and tested for char length and flame duration by vertical Bunsen Burner flame test, Method D-777-46, A.S.T.M.

Formulation No. 1: Parts by wt.
 10% casein solution _____ 24.65
 Triton X-100 (wetting agent) _____ 0.08
 Hydrated aluminum oxide _____ 17.46
 Zinc oxide dispersion, 50% solid _____ 3.85
 Antioxidant _____ 1.00
 Neoprene Latex 400, 50% solid _____ 77.05
 10% sodium dichromate solution _____ 0.36

Formulation No. 2: Parts by wt.
 10% casein solution _____ 24.65
 Triton X-100 (wetting agent) _____ 0.08
 Hydrated aluminum oxide _____ 17.46
 Zinc oxide dispersion, 50% solid _____ 3.85
 Antioxidant _____ 1.54
 Neoprene Latex 400, 50% solid _____ 77.05
 10% sodium dichromate solution _____ 0.36
 Antifoam, AF _____ 0.50
 Water emulsion of liquid chlorinated paraffin, 70% chlorine (66.5% solid) _____ 70.00

Formulation No. 3: Parts by wt.
 10% casein solution _____ 24.65
 Triton X-100 (wetting agent) _____ 0.08
 Hydrated aluminum oxide _____ 17.46
 Calcium carbonate _____ 20.00
 Zinc oxide dispersion, 50% solid _____ 3.85
 Antioxidant _____ 1.54
 Neoprene Latex 400, 50% solid _____ 77.05
 10% sodium dichromate solution _____ 0.36
 Antifoam, AF _____ 0.50
 Water emulsion of liquid chlorinated paraffin, 70% chlorine (66.5% solid) _____ 70.00

Formulation No. 4: Parts by wt.
 10% casein solution _____ 24.65
 Triton X-100 _____ 0.08
 Hydrated Aluminum oxide _____ 37.46
 Antimony oxide _____ 10.00
 Zinc oxide dispersion, 50% solid _____ 3.85
 Antioxidant _____ 1.54
 Neoprene Latex 400, 50% solid _____ 77.05
 10% sodium dichromate solution _____ 0.36
 Antifoam, AF _____ 0.50
 Water emulsion of liquid chlorinated paraffin, 70% chlorine (66.5% solid) _____ 70.00

Formulation No. 5: Parts by wt.
 10% casein solution _____ 24.65
 Triton X-100 _____ 0.58
 Hydrated aluminum oxide _____ 37.46
 Antimony oxide _____ 15.00
 Zinc oxide dispersion, 50% solid _____ 3.85
 Antioxidant _____ 1.54
 Neoprene Latex 400, 50% solid _____ 77.05
 10% sodium dichromate solution _____ 0.36
 Antifoam, AF _____ 0.50
 Water emulsion of liquid chlorinated paraffin, 70% chlorine (66.5% solid) _____ 70.00

The flame resistance tests, per vertical flame Bunsen Burner, conducted in the laboratory, are as follows:

| Formulation No.: | Char length | Flame duration, seconds |
|---|---|---|
| 1 | Complete char | |
| 2 | do | |
| 3 | do | |
| 4 | 1 15/16 inches | 5-6 |
| 5 | 1.0 inch | 3-4 |

A series of other formulations were also tried by reducing the amounts of chlorinated paraffin and antimony oxide. As compared to Formulation No. 5, they all showed high char length and flame duration. In other cases, the amount of chlorinated paraffin or antimony or both were increased, without showing any appreciable reduction in char length and flame duration. This led to the conclusion that Formulation No. 5 is a well-balanced formulation, although a slight variation of various ingredients may be tolerated.

As will be seen in Formulations Nos. 1, 2 and 3, complete charring of the laminate took place, in spite of the presence of adequate amounts of chlorinated paraffins and neoprene latex; but the addition of 6–10% of antimony oxide in Formulation No. 4 and No. 5 gives excellent flame retardancy to the laminate, with a char length of about 1" and a flame duration of about 3–4 seconds. This indicated the basis for and the existence of synergistic effect within the laminant system and in the construction of flame-proof barrier material of the present invention.

It may be noted here that purchase of flame-proof paper from paper mills by the manufacturers of flame retardant barrier materials is expensive. In this invention, an attempt has been made to make the fibrous ply of the barrier material permanently flame-proof and provide a non-leachable characteristic, by a judicious use of flame-proof adhesive. This not only gives excellent lamination between kraft, foil and reinforced fiber glass constructions, but also renders otherwise flammable paper plies flame resistant.

The characteristic features of the invention are:

(1) Development of an emulsion type adhesive system, which, because of the synergistic effect, is not only non-burning, but also imparts flame retardancy to the otherwise combustible outer surface of the combustible fibrous material.

(2) Because of the synergistic effect, untreated kraft can be used as a direct replacement for flame-proof kraft.

(3) The adhesive is compounded from a synthetic resin or elastomeric polymers for good lamination; chlorinated organic compounds and fire-proof inorganic salts, for the development of synergistic effect; and hydrated oxide as filler produces stream at elevated temperature which accelerates the formation of hydrogen chloride, and provides better synergistic effect in the presence of a synergist.

It is believed that during lamination, when the laminate is still in the dry zone, part of the dried chlorinated paraffin actually melts and is impregnated in the outer fibrous ply at elevated temperatures of the heated drum which is (250° F.), along with the synergists, and actually makes the fibrous material partially flame resistant.

(4) In spite of the use of chlorinated organic compounds in the adhesive composition, the laminating properties of the adhesive have not been sacrificed. In the other compositions mostly based on chlorinated organic compounds, the laminate will tend to soften at elevated temperature, and has the tendency to delaminate under fire conditions. Due to the presence of neoprene latex, which is an elastomeric polymer, excellent laminating properties of the adhesive have been maintained. The construction shows no sign of delamination at 300° F. for 72 hours, or under fire conditions which was verified at Underwriters Laboratory tunnel test for flame spread.

The above laminate of the invention need not be entirely of a foil/kraft construction, but the two plies may be selected from kraft (untreated or flame-proof), asbestos, non-woven fibrous sheets and webs, foils and vinyl films. In addition, the constructions can be reinforced with glass and other fibres during the laminating operation.

A functional surface coating can be applied to either ply of the finished lamination. Such a coating would be used to contribute to functional properties, i.e., color, scrub resistance, improved flame resistance and other properties to the lamination. Additionally, the coated or uncoated constructions can be embossed, creped or otherwise treated to add to the asthetic or functional value of the lamination.

It will be apparent that many changes may be made in the described composition and laminate of the invention without departing from the spirit of the invention defined in the following claims.

I claim:

1. A flame retardant fire barrier laminate characterized by low flame spread and smoke development comprising a laminate of fibrous material and a second ply bonded by an emulsion type adhesive mix laminant, the emulsion laminant comprising an adhesive mix consisting essentially of the following ingredients: (a) a halogenated paraffin; (b) an oxide of metal of the arsenic group; (c) a filler selected from the group of a hydrated metal oxide, calcium silicate, calcium carbonate and magnesium silicate; and (d) a binder for the mix selected from the class consisting of elastomeric and synthetic resin polymers, said emulsion laminant being inherently non-burning and when subjected to a flame and flame temperatures imparting flame-retardancy to the fibrous ply of the laminate.

2. The laminate of claim 1, in which the fibrous ply is selected from the group of non-flame resistant kraft paper, flame resistant kraft paper, asbestos, non-woven fibrous sheets and webs.

3. The laminate of claim 1, in which in lieu for the fibrous ply there is used a plastic film selected from the group consisting of polyvinyl chloride, poly-vinylidene chloride and copolymers thereof.

4. The laminate of claim 1, wherein the fibrous material ply is a non-flame proof fibrous material and the adhesive weight of the laminant is from 70 to 110% based on the weight of the fibrous material.

5. The laminate of claim 1, where the fibrous material is a flame-proof kraft paper already impregnated with an oxide of metal of the arsenic group, the ingredient (b) of said claim 5 being thereby supplied by the oxide of metal of the arsenic group of the flame-proof kraft paper.

6. The laminate of claim 1 in which the solids of the recited ingredients are in the relative proportions by weight of solids of (a) from 35% to 50%; (b) from 9% to 20%; (c) from 5% to 40% and (d) from 10% to 40%.

7. The laminate of claim 1 in which the second ply is a metal foil ply.

8 The laminate of claim 1, wherein (a) the halogenated paraffin is a water emulsion of liquid chlorinated paraffin, (b) the oxide of metal of the arsenic group is a metal selected from the group of antimony, and arsenic, (c) the hydrated metal oxide is hydrated aluminum oxide, and (d) the elastomeric and synthetic resin binders are selected from the group of neoprene latex, poly-vinylidene chloride latex, vinyl chloride acrylic copolymer, polyvinyl chloride latex, vinyl acetate copolymer and styrene-butadiene latex.

9. The laminate of claim 8, in which the solids of the recited ingredients are in the following relative parts by weight: (a) 46 parts, (b) 15 parts, (c) 37 parts and (d) 39 parts.

References Cited

UNITED STATES PATENTS

| | | | |
|---|---|---|---|
| 2,568,849 | 9/1951 | Fasold et al. | 106—15 X |
| 2,938,937 | 5/1960 | Shenk | 161—403 X |
| 3,007,825 | 11/1961 | Cubberley et al. | 161—235 X |

FOREIGN PATENTS

| | | | |
|---|---|---|---|
| 260,289 | 1/1963 | Australia | 161—403 |

WILLIAM A. POWELL, Primary Examiner

U.S. Cl. X.R.

106—15; 156—327; 161—218, 220, 403